I.E. Palmer's Machine for Making Cordage

N° 87,964

Pat'd Mar 16" 1869

Witnesses
H. Cler
A. Hinnier

Inventor
I. E. Palmer

ISAAC E. PALMER, OF HACKENSACK, NEW JERSEY.

Letters Patent No. 87,964, dated March 16, 1869.

---

IMPROVEMENT IN MACHINE FOR MAKING CORDAGE.

---

The Schedule referred to in these Letters Patent and making part of the same.

---

*To all whom it may concern:*

Be it known that I, ISAAC E. PALMER, of Hackensack, in the county of Bergen, and State of New Jersey, have invented a new and useful Improvement in Machinery for the Manufacture of Twist and Cordage, of which the following is a full, clear, and exact description, reference being had to the accompanying drawing, forming part of this specification, and in which—

Figure 1:
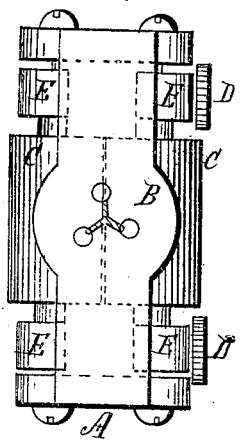
Figure 2:
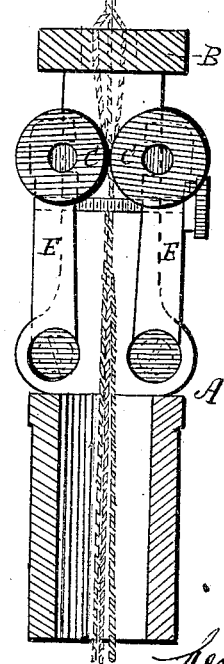

Figure 1 represents a plan of a laying-top to a cordage-machine, having my improvement applied to it; and Figure 2, a sectional elevation thereof.

Similar letters of reference indicate corresponding parts.

This, my invention, consists in a novel application or arrangement of rollers to equalize the delivery of strands, or yarns, to the laying-device of a cording-machine, and whereby the strands, however unequal may be their tension in their passage from the twisting-spindles, may have a perfectly uniform tension at the point of delivery to the laying-device, and the same may be delivered to the latter in a perfectly uniform manner, so that, when they are formed into a rope, or cord, such rope, or cord, will have a perfectly uniform appearance on all sides, as well as having all its strands equally capable of resisting the strain to which the rope, or cord may be subjected.

Referring to the accompanying drawing—

A represents the laying-top of a rope, or cordage-machine.

More or less immediately beneath or in rear of the head B of the laying-top, are rollers C C, made of or covered with rubber cloth, or other suitable material. These should be so set, or arranged, and their peripheries, or surfaces of such a character, as that, in the passage of the strands through the laying-top to the "take-up," they will either pinch or otherwise hold on the strands, so as to effect an equal delivery of them through the head B.

Thus, although more may be used, only two rollers are here shown, and these so set, or arranged, as to pinch on the strands passing through between them, which action may be regulated by means of screws, D D, arranged to operate swinging jaws, E E, which carry said rollers; or any other suitable means of adjustment may be employed to regulate the degree of hold which the rollers exert upon the strands, so as to equalize their delivery.

To illustrate this, it will be observed that, supposing the strands to be unequally pulled, or drawn upon by the take-up, the strand which has the greatest draught upon it will be the driver to, as it were, or set in motion the rollers C C, that, in their hold or friction on the other strands, will thus be made to project or feed the latter through them at the same velocity as the strand having the greatest pull on it, and thus the delivery of the several strands, or yarns, either to the laying or twisting-device, is equalized.

What is here claimed, and desired to be secured by Letters Patent, is—

The rollers C C, supported on adjustable swinging jaws E E, in combination with the top A and head B, all constructed and arranged substantially as shown and described.

ISAAC E. PALMER.

Witnesses:
  HENRY T. BROWN,
  A. LE CLERC.